(12) United States Patent
Cho et al.

(10) Patent No.: US 12,280,632 B2
(45) Date of Patent: Apr. 22, 2025

(54) MOUNTING SYSTEM FOR HVAC COMPONENT

(71) Applicants: HYUNDAI MOTOR COMPANY, Seoul (KR); KIA CORPORATION, Seoul (KR)

(72) Inventors: Yun A Cho, Suwon-si (KR); Byeong Moo Jang, Suwon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 381 days.

(21) Appl. No.: 17/960,398

(22) Filed: Oct. 5, 2022

(65) Prior Publication Data

US 2023/0382183 A1 Nov. 30, 2023

(30) Foreign Application Priority Data

May 25, 2022 (KR) .................. 10-2022-0064203

(51) Int. Cl.
*B60H 1/00* (2006.01)
*B62D 25/08* (2006.01)
*B62D 25/14* (2006.01)

(52) U.S. Cl.
CPC ....... *B60H 1/0055* (2013.01); *B60H 1/00207* (2013.01); *B60H 1/00392* (2013.01); *B62D 25/08* (2013.01); *B62D 25/142* (2013.01)

(58) Field of Classification Search
CPC .............. B60H 1/0055; B60H 1/0067; B60H 1/00207; B60H 1/00392; B60H 1/00428; B60H 1/00535; B60H 2001/00214; B62D 25/08

USPC ....................... 296/193.06, 203.01, 2, 70, 72
See application file for complete search history.

(56) References Cited

U.S. PATENT DOCUMENTS

| 10,457,332 B1 * | 10/2019 | Peru ........................ B62D 25/14 |
| 10,710,424 B2 | 7/2020 | Eckert et al. |
| 11,724,562 B2 * | 8/2023 | Bielicki ............. B60H 1/00535 |
| | | 62/244 |

FOREIGN PATENT DOCUMENTS

| EP | 1034952 B1 | 10/2003 | |
| GB | 2181178 A * | 4/1987 | ............ B60R 11/00 |
| JP | 2010-006199 A | 1/2010 | |
| KR | 2018-0011906 A | 2/2018 | |
| KR | 2019-0058818 A | 5/2019 | |

(Continued)

OTHER PUBLICATIONS

GB2181178 Text (Year: 1987).*
WO2012114019 Text (Year: 2012).*

*Primary Examiner* — Dennis H Pedder
(74) *Attorney, Agent, or Firm* — MCDONNELL BOEHNEN HULBERT & BERGHOFF LLP

(57) ABSTRACT

A mounting system for a heating, ventilation, and air conditioning (HVAC) component, including a dash panel configured to divide a front compartment from a passenger compartment, and having an opening, a plurality of mounting portions located around the opening, and configured to mount the HVAC component, and a vertical reinforcing member located adjacent to the opening, and extending along the height of the dash panel. The dash panel includes a first surface facing the front compartment and a second surface facing the passenger compartment, and at least some of the plurality of mounting portions are provided to the vertical reinforcing member.

16 Claims, 14 Drawing Sheets

(56) References Cited

FOREIGN PATENT DOCUMENTS

| KR | 10-2021372 B1 | 9/2019 | | |
|----|---------------|--------|---|---|
| KR | 2020-0129560 A | 11/2020 | | |
| WO | WO-2012114019 A1 | * | 8/2012 | ............... B62D 1/16 |

* cited by examiner

MOUNTING SYSTEM FOR HVAC COMPONENT

CROSS REFERENCE TO RELATED APPLICATIONS

This application is based on and claims the benefit of priority to Korean Patent Application No. 10-2022-0064203, filed on May 25, 2022, in the Korean Intellectual Property Office, the disclosure of which is incorporated herein in its entirety by reference.

TECHNICAL FIELD

The present disclosure relates to a mounting system for a heating, ventilation, and air conditioning (HVAC) component, and more particularly, to a mounting system for an HVAC component providing sufficient stiffness of a dash panel and sufficient mounting stiffness of an HVAC component mounted on the dash panel.

BACKGROUND

A vehicle includes a dash panel configured to divide a front compartment from a passenger compartment. A front surface of the dash panel faces the front compartment, and a rear surface of the dash panel faces the passenger compartment. A powertrain including a prime mover may be disposed in the front compartment. For example, in an internal combustion engine vehicle, a mechanical powertrain system including an internal combustion engine and a transmission may be disposed in the front compartment, and in an electric vehicle, an electric powertrain system including an electric motor, an inverter, and a transmission may be disposed in the front compartment.

Since the electric vehicle has no internal combustion engine in the front compartment, the front compartment of the electric vehicle may have a relatively larger space than the front compartment of the internal combustion engine vehicle. As a battery is disposed under a floor of the electric vehicle, the electric vehicle may have a flat floor structure.

Since the existing internal combustion engine vehicle has a heating, ventilation, and air conditioning (HVAC) module in the passenger compartment, the space of the passenger compartment may be relatively narrow. For example, as the HVAC module in the internal combustion engine vehicle is mounted on the rear surface of the dash panel, the HVAC module may be disposed in the passenger compartment.

On the other hand, as the front compartment of the electric vehicle does not have any internal combustion engine, it may provide enough space for receiving at least some HVAC components of the HVAC module. Accordingly, when at least some HVAC components of the HVAC module are received in the front compartment of the electric vehicle, the passenger compartment of the electric vehicle may provide a relatively large space. In particular, a cockpit located on the front of the passenger compartment may be slimmed down and a flat floor structure may be built more easily.

The above information described in this background section is provided to assist in understanding the background of the inventive concept, and may include any technical concept which is not considered as the prior art that is already known to those skilled in the art.

SUMMARY

The present disclosure has been made to solve the above-mentioned problems occurring in the prior art while advantages achieved by the prior art are maintained intact.

An aspect of the present disclosure provides a mounting system for a heating, ventilation, and air conditioning (HVAC) component designed to allow at least one HVAC component of an HVAC module to be firmly mounted on a front surface of a dash panel (i.e., the surface of the dash panel facing a front compartment) by increasing stiffness of the dash panel using a vertical reinforcing member, a horizontal bracket, and/or a horizontal reinforcing member, thereby locating at least one HVAC component of the HVAC module in the front compartment, which makes it possible to provide a relatively large space in a passenger compartment, to slim down a cockpit located on the front of the passenger compartment, and to easily build a flat floor structure of a vehicle body.

According to an aspect of the present disclosure, a mounting system for an HVAC component may include a dash panel configured to divide a front compartment from a passenger compartment, and having an opening, an HVAC component located in the front compartment, a plurality of mounting portions located around the opening, and configured to mount the HVAC component, and a vertical reinforcing member located adjacent to the opening, and extending along the height of the dash panel. The dash panel may include a first surface facing the front compartment, and a second surface facing the passenger compartment. At least some of the plurality of mounting portions may be provided to the vertical reinforcing member. The vertical reinforcing member may be mounted on the dash panel around the opening of the dash panel and extend along the height of the dash panel so that the vertical reinforcing member may increase stiffness of the dash panel.

The mounting system may further include a plurality of horizontal brackets located adjacent to the opening, and extending along the length of the dash panel. At least some of the plurality of mounting portions may be provided to the horizontal brackets. The plurality of horizontal brackets may be located adjacent to the opening so that the plurality of horizontal brackets may increase stiffness of the dash panel.

The vertical reinforcing member and the horizontal brackets may be mounted on the first surface of the dash panel, and the plurality of mounting portions may be provided to the vertical reinforcing member and the horizontal brackets. As the plurality of mounting portions are provided to the vertical reinforcing member and the horizontal brackets, and the vertical reinforcing member and the horizontal brackets are mounted on the first surface of the dash panel, the HVAC component may be firmly mounted on the first surface of the dash panel through the vertical reinforcing member and the horizontal brackets so that mounting stiffness of the HVAC component may be sufficiently achieved. In particular, as the HVAC component is mounted on the first surface of the dash panel, the HVAC component may be located in the front compartment, and thus a relatively large space may be provided in the passenger compartment.

The mounting system may further include a horizontal reinforcing member located adjacent to the opening, extending along the length of the dash panel, and connected to the vertical reinforcing member. As the horizontal reinforcing member extends along the length of the dash panel around the opening of the dash panel and is connected to the vertical reinforcing member, the stiffness of the dash panel may be improved.

The vertical reinforcing member and the horizontal reinforcing member may be mounted on the first surface of the dash panel, and the plurality of mounting portions may be provided to the vertical reinforcing member and the horizontal reinforcing member. As the plurality of mounting portions are provided to the vertical reinforcing member and the horizontal reinforcing member, and the vertical reinforcing member and the horizontal reinforcing member are mounted on the first surface of the dash panel, the HVAC component may be firmly mounted on the first surface of the dash panel through the vertical reinforcing member and the horizontal reinforcing member so that the mounting stiffness of the HVAC component may be sufficiently achieved.

The mounting system may further include a pair of rear lower members mounted on both side edges of the dash panel; and a dash cross member located adjacent to the opening, extending along the length of the dash panel, and connecting the pair of rear lower members. The dash cross member may have at least one mounting portion for mounting the HVAC component. As the dash cross member connecting the pair of rear lower members extends along the length of the dash panel around the opening of the dash panel, peripheral stiffness of the opening of the dash panel may be improved.

The mounting system may further include a stiffened cross member mounted on the second surface of the dash panel, and extending along the length of the dash panel. As the stiffened cross member extends along the length of the dash panel on the second surface of the dash panel, the stiffness of the dash panel may be further improved.

The mounting system may further include a pair of front pillars connected to both sides of the dash panel; and a pair of end brackets fixed to both ends of the stiffened cross member, and connected to the pair of front pillars, respectively. The stiffened cross member may firmly connect the pair of front pillars through the pair of end brackets. Thus, the stiffness of the dash panel may be further improved, and a load applied to the dash panel may be uniformly distributed and transferred to the pair of front pillars.

The stiffened cross member may be fixed to a top edge of the dash panel, and the stiffened cross member may be located adjacent to the opening. As the stiffened cross member is located adjacent to the opening of the dash panel, the stiffness of the dash panel may be improved.

The mounting system may further include a vertical stiffened member fixed to the second surface of the dash panel, and extending along the height of the dash panel. As the vertical stiffened member is mounted on the second surface of the dash panel, the stiffness of the dash panel may be further improved.

The vertical stiffened member may be located adjacent to the opening, and be connected to the stiffened cross member. As the vertical stiffened member is connected to the stiffened cross member around the opening, the stiffness of the dash panel may be improved.

The mounting system may further include a reinforcement plate mounted on the second surface of the dash panel, and having an opening aligned with the opening of the dash panel. The reinforcement plate may overlap a peripheral portion of the opening of the dash panel on the second surface of the dash panel. As the reinforcement plate is fixed to the peripheral portion of the opening of the dash panel, the stiffness of the dash panel may be further improved.

The mounting system may further include a pair of mounting brackets mounted on the first surface of the dash panel, and extending from a top edge of the dash panel toward the opening of the dash panel, and a horizontal reinforcing member located adjacent to the opening, extending along the length of the dash panel, and connecting the pair of mounting brackets. A bottom end of each mounting bracket may be adjacent to a top edge of the opening. As the pair of mounting brackets are located adjacent to the opening of the dash panel, and the horizontal reinforcing member connects the pair of mounting brackets, the stiffness of the dash panel may be improved.

The mounting system may further include a pair of damper housings disposed in front of the dash panel, and a pair of strut bars connecting the pair of damper housings and the pair of mounting brackets, respectively. As the pair of mounting brackets are connected to the pair of damper housings through the pair of strut bars, a load applied to the dash panel may be uniformly distributed and transferred to the pair of strut bars.

The mounting system may further include a cross bar connecting the pair of damper housings. The cross bar may have at least one mounting portion, and a front portion of the HVAC component may be mounted on the mounting portion of the cross bar. As the front portion of the HVAC component is mounted on the mounting portion of the cross bar, the HVAC component may be firmly supported between the first surface of the dash panel and the cross bar, and thus the mounting stiffness of the HVAC component located in the front compartment of the vehicle may be sufficiently achieved.

One of the pair of mounting brackets may be connected to the vertical reinforcing member, and the mounting bracket and the vertical reinforcing member may be continuously connected along the height of the dash panel. As the mounting bracket and the vertical reinforcing member are continuously connected along the height of the dash panel, the stiffness of the dash panel may be further improved.

The pair of mounting brackets may be fixed to a cowl, and the cowl may be disposed on the dash panel. As the pair of mounting brackets are connected to the cowl disposed on the dash panel, the dash panel may define various load paths by the pair of mounting brackets and the cowl.

Each mounting portion may include mounting hardware to which a mounting lug of the HVAC component is mounted, and a stiffened portion provided around the mounting hardware and supporting the mounting hardware. As the mounting portion has the stiffened portion provided around the mounting hardware and supporting the mounting hardware, the stiffened portion may increase the stiffness of the mounting portion and the support stiffness of the mounting hardware even when the dash panel, the reinforcing members, and the like are made of a material (e.g. an aluminum material) with lower stiffness than steel. Thus, the mounting stiffness of the HVAC components may be sufficiently achieved.

BRIEF DESCRIPTION OF THE FIGURES

The above and other objects, features and advantages of the present disclosure will be more apparent from the following detailed description taken in conjunction with the accompanying drawings.

DETAILED DESCRIPTION

Figure 1:
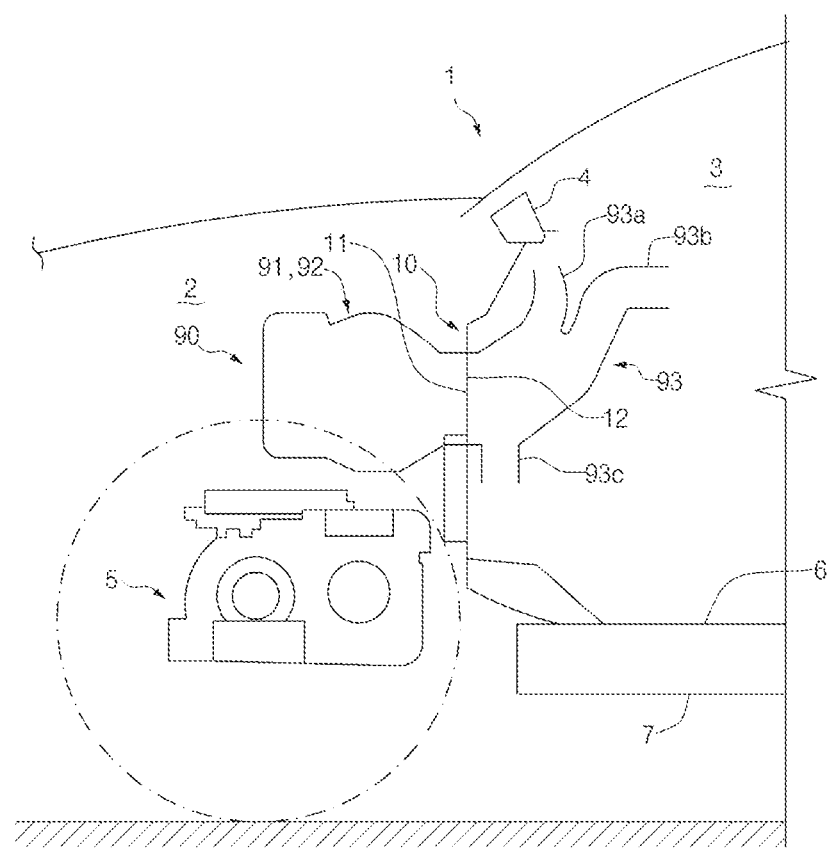
FIG. 1 illustrates a front structure of a vehicle to which a mounting system for a heating, ventilation, and air conditioning (HVAC) component according to an embodiment of the present disclosure is applied.

Hereinafter, embodiments of the present disclosure will be described in detail with reference to the accompanying drawings. In the drawings, the same reference numerals will be used throughout to designate the same or equivalent elements. In addition, a detailed description of well-known techniques associated with the present disclosure will be ruled out in order not to unnecessarily obscure the gist of the present disclosure.

Terms such as first, second, A, B, (a), and (b) may be used to describe the elements in embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Referring to FIG. 1, a vehicle 1 may include a dash panel 10 configured to divide a front compartment 2 from a passenger compartment 3, the dash panel 10 has a length extending horizontally along a width of the vehicle 1 and a height extending vertically along a height of the vehicle 1. The dash panel 10 may have a first surface 11 facing the front compartment 2, and a second surface 12 facing the passenger compartment 3.

An electric powertrain system 5 may be disposed in the front compartment 2. A cowl 4 may be disposed on the dash panel 10. Specifically, the cowl 4 may be mounted on a top edge of the dash panel 10. A floor 6 may form the bottom of the passenger compartment 3, and a battery 7 may be disposed under the floor 6.

A heating, ventilation, and air conditioning (HVAC) module 90 may be mounted on the first surface 11 and the second surface 12 of the dash panel 10 so that at least some components 91 and 92 of the HVAC module 90 may be located in the front compartment 2, and the other component 93 of the HVAC module 90 may be located in the passenger compartment 3.

Figure 4:
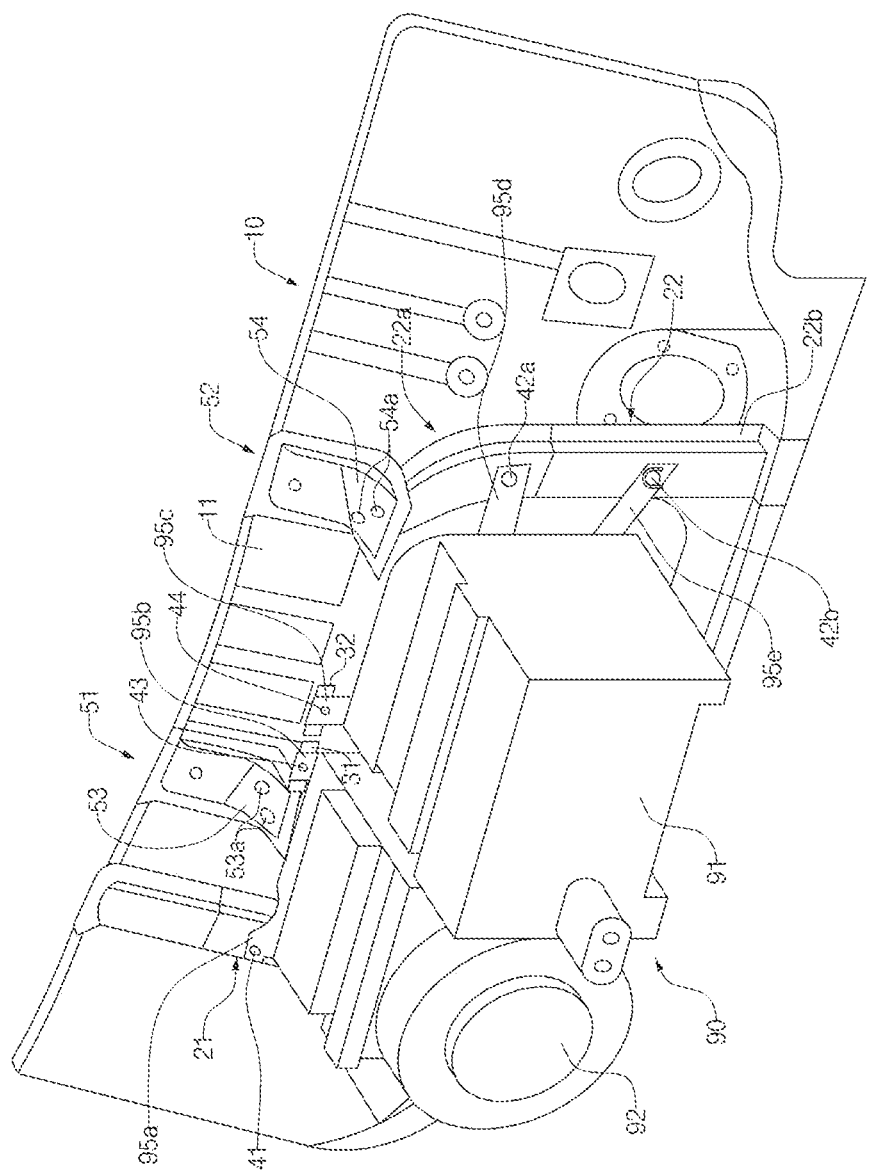
FIG. 4 illustrates a perspective view of a state in which an air conditioning section and a blower section of an HVAC module is mounted on a mounting system for an HVAC component according to an embodiment of the present disclosure.

Referring to FIG. 4, the HVAC module 90 may include an air conditioning section 91 in which an evaporator, an interior condenser (or heater core), an air mixing door, a PTC heater, and the like are embedded, and a blower section 92 configured to draw in outdoor air and/or indoor air and blow the air into the air conditioning section 91. The air conditioning section 91 and the blower section 92 may have a relatively large volume, and the air conditioning section 91 and the blower section 92 may be mounted on the first surface 11 of the dash panel 10 so that the air conditioning section 91 and the blower section 92 of the HVAC module 90 may be located in the front compartment 2.

Referring to FIG. 1, the HVAC module 90 may include an air distributor section 93 distributing the air having a temperature adjusted by the air conditioning section 91 and discharging the air to the passenger compartment 3. The air distributor section 93 may be mounted on the second surface 12 of the dash panel 10 so that the air distributor section 93 may be located in the passenger compartment 3.

As described above, an HVAC component of a relatively large volume such as the HVAC module 90 may be mounted on the first surface 11 and the second surface 12 of the dash panel 10. Compared to an existing internal combustion engine vehicle, at least some components of an HVAC system having relatively large volumes may be disposed in the front compartment 2. Accordingly, a space of the passenger compartment 3 occupied by the other components of the HVAC system may be minimized, and thus a relatively large interior space may be provided in the passenger compartment 3.

Figure 2:
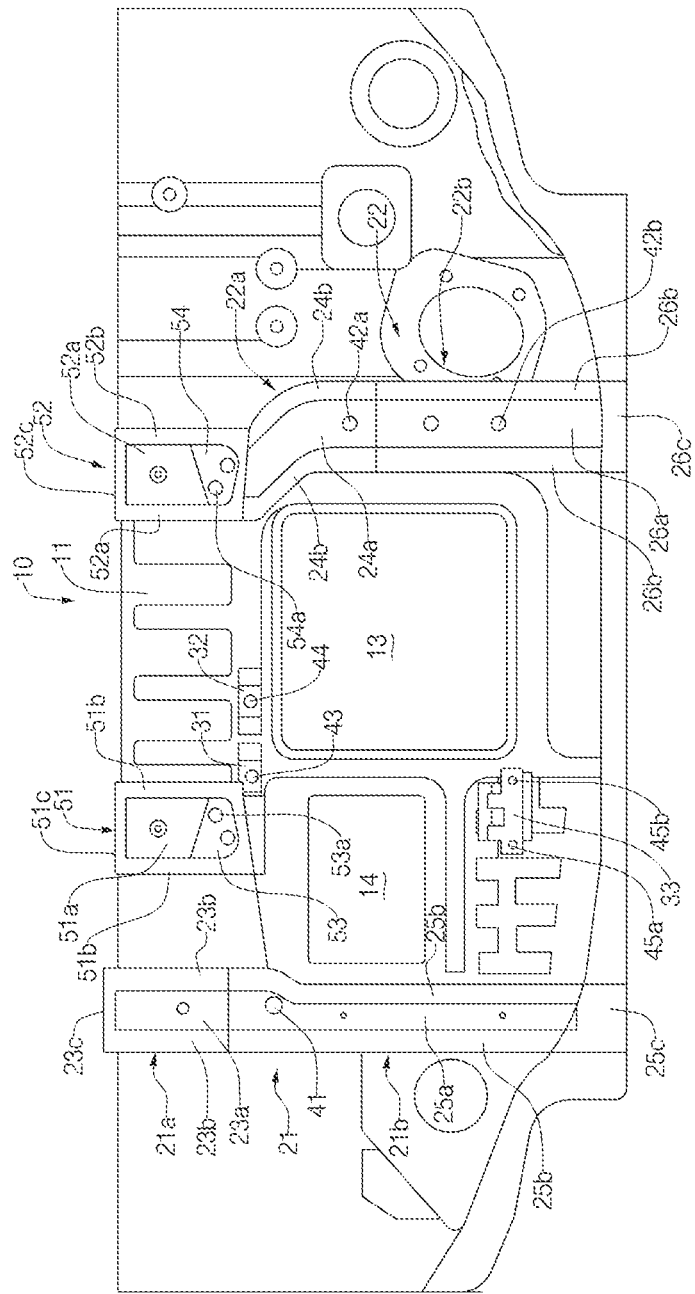
FIG. 2 illustrates a front view of a mounting system for an HVAC component according to an embodiment of the present disclosure.
Figure 3:
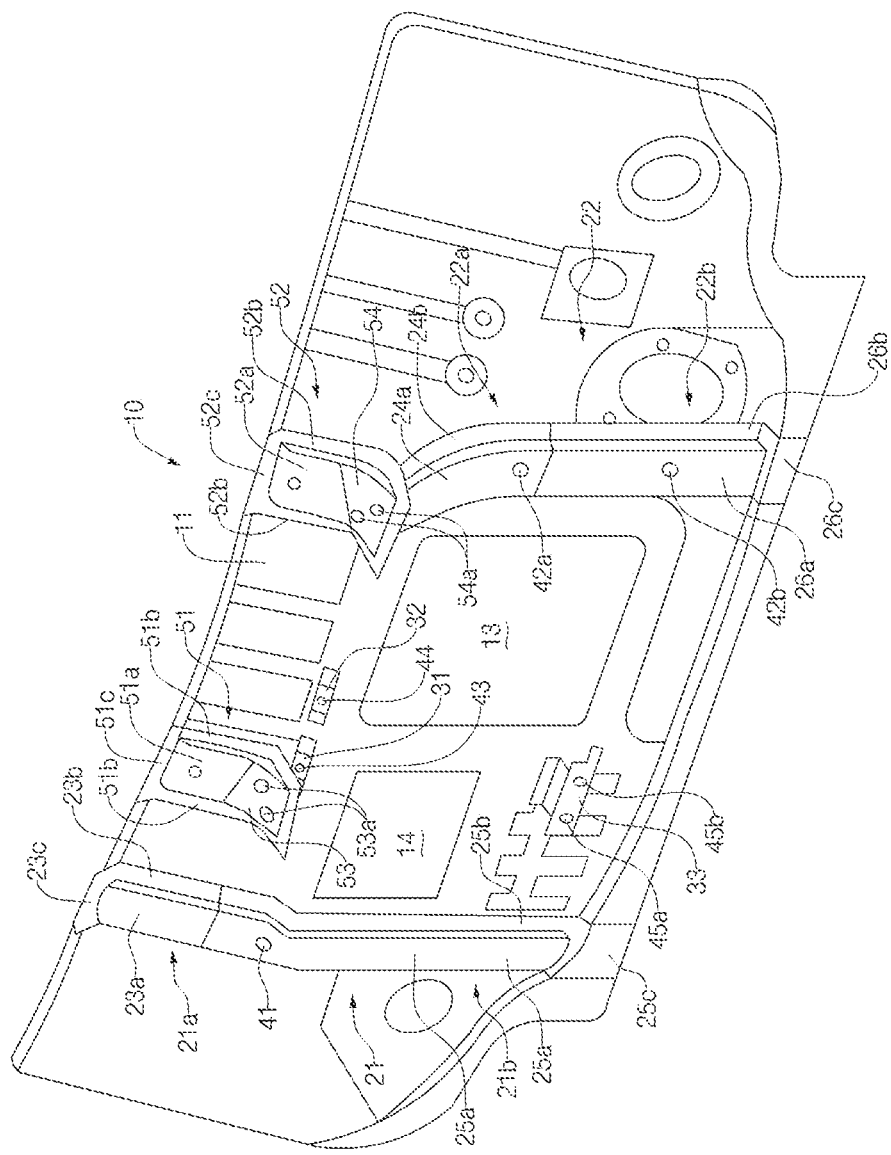
FIG. 3 illustrates a perspective view of a mounting system for an HVAC component according to an embodiment of the present disclosure.

Referring to FIGS. 2 and 3, a mounting system for an HVAC component according to an embodiment of the present disclosure may include the dash panel 10.

The dash panel 10 may have a large opening 13 and a small opening 14 for communicating with the HVAC module 90, and a size of the opening 14 may be less than that of the opening 13. The large opening 13 and the small opening 14 may be spaced apart from each other along the length of the dash panel 10. The large opening 13 may communicate with the air conditioning section 91 of the HVAC module 90, and the small opening 14 may communicate with the blower section 92 of the HVAC module 90.

Referring to FIGS. 2 and 3, the large opening 13 may be a rectangular opening having two vertical edges parallel to each other and two horizontal edges parallel to each other, and the small opening 14 may be a rectangular opening having two vertical edges parallel to each other and two horizontal edges parallel to each other.

Referring to FIGS. 2 and 3, the mounting system for an HVAC component according to an embodiment of the present disclosure may include a first vertical reinforcing member 21 and a second vertical reinforcing member 22 fixed to the first surface 11 of the dash panel 10. The first vertical reinforcing member 21 and the second vertical reinforcing member 22 may be spaced apart from each other along the length of the dash panel 10. The first vertical reinforcing member 21 may be adjacent to the vertical edge of the small opening 14, and the second vertical reinforcing member 22 may be adjacent to the vertical edge of the large opening 13. The vertical reinforcing members 21 and 22 may extend vertically around the openings 13 and 14 of the dash panel 10, thereby improving stiffness of the dash panel 10.

The first vertical reinforcing member 21 may extend along the height of the dash panel 10, and the first vertical reinforcing member 21 may include an upper portion 21a extending vertically from the top edge of the dash panel 10, and a lower portion 21b extending from a bottom end of the upper portion 21a to a bottom edge of the dash panel 10. The upper portion 21a and the lower portion 21b may be continuously connected along the height of the dash panel 10.

The upper portion 21a may include a channel 23a having a cavity defined therein, and two flanges 23b provided on both side edges of the channel 23a. The two flanges 23b may be fixed to the first surface 11 of the dash panel 10 using fasteners, welding, and/or the like so that the channel 23a of the upper portion 21a and the dash panel 10 may form a closed cross section. The upper portion 21a may have a top flange 23c provided on a top end thereof, and the top flange 23c may be fixed to the cowl 4 using fasteners, welding, and/or the like.

The lower portion 21b may include a channel 25a having a cavity defined therein, and two flanges 25b provided on both side edges of the channel 25a. The two flanges 25b may be fixed to the first surface 11 of the dash panel 10 using fasteners, welding, and/or the like so that the channel 25a of the lower portion 21b and the dash panel 10 may form a closed cross section. The lower portion 21b may have a bottom flange 25c provided on a bottom end thereof, and the bottom flange 25c may be fixed to the bottom edge of the dash panel 10 using fasteners, welding, and/or the like.

According to an embodiment, the upper portion 21a may be manufactured independently of the lower portion 21b, and the bottom end of the upper portion 21a may be fixed to a top end of the lower portion 21b using fasteners, welding, and/or the like.

According to another embodiment, the upper portion 21a and the lower portion 21b may form a unitary one-piece structure by pressing, casting, and/or the like.

The second vertical reinforcing member 22 may extend along the height of the dash panel 10, and the second vertical reinforcing member 22 may include an upper portion 22a, and a lower portion 22b extending from a bottom end of the upper portion 22a to the bottom edge of the dash panel 10. The upper portion 22a and the lower portion 22b may be continuously connected along the height of the dash panel 10.

The upper portion 22a may include a channel 24a having a cavity defined therein, and two flanges 24b provided on both side edges of the channel 24a. The two flanges 24b may be fixed to the first surface 11 of the dash panel 10 using fasteners, welding, and/or the like so that the channel 24a of the upper portion 22a and the dash panel 10 may form a closed cross section. A top end of the upper portion 22a may be fixed to a second mounting bracket 52 to be described below using fasteners, welding, and/or the like.

The lower portion 22b may include a channel 26a having a cavity defined therein, and two flanges 26b provided on both side edges of the channel 26a. The two flanges 26b may be fixed to the first surface 11 of the dash panel 10 using fasteners, welding, and/or the like so that the channel 26a of the lower portion 22b and the dash panel 10 may form a closed cross section. The lower portion 22b may have a bottom flange 26c provided on a bottom end thereof, and the bottom flange 26c may be fixed to the bottom edge of the dash panel 10 using fasteners, welding, and/or the like.

According to an embodiment, the upper portion 22a may be manufactured independently of the lower portion 22b, and the bottom end of the upper portion 22a may be fixed to a top end of the lower portion 22b using fasteners, welding, and/or the like.

According to another embodiment, the upper portion 22a and the lower portion 22b may form a unitary one-piece structure by pressing, casting, and/or the like.

As described above, the first vertical reinforcing member 21 and the second vertical reinforcing member 22 may extend vertically around the openings 13 and 14 of the dash panel 10, thereby improving stiffness of the dash panel 10. In addition, a load applied to the dash panel 10 may be transferred and distributed through the first vertical reinforcing member 21 and the second vertical reinforcing member 22.

Referring to FIGS. 2 and 3, the mounting system for an HVAC component according to an embodiment of the present disclosure may include a first horizontal bracket 31, a second horizontal bracket 32, and a third horizontal bracket 33 which are fixed to the first surface 11 of the dash panel 10.

The first horizontal bracket 31 may be disposed above the small opening 14, and the second horizontal bracket 32 may be disposed above the large opening 13. Specifically, the first horizontal bracket 31 may be disposed adjacent to a top horizontal edge of the small opening 14, and the second horizontal bracket 32 may be disposed adjacent to a top horizontal edge of the large opening 13.

The third horizontal bracket 33 may be disposed below the small opening 14 and the large opening 13. Specifically, the third horizontal bracket 33 may be disposed adjacent to a bottom horizontal edge of the small opening 14 and a bottom horizontal edge of the large opening 13.

The plurality of horizontal brackets 31, 32, and 33 may be located around the openings 13 and 14 so that the plurality of horizontal brackets 31, 32, and 33 may improve stiffness of the dash panel 10.

Referring to FIGS. 2 and 3, the mounting system for an HVAC component according to an embodiment of the present disclosure may include a plurality of mounting portions 41, 42a, 42b, 43, 44, 45a, and 45b for mounting an HVAC component such as the HVAC module 90.

The plurality of mounting portions 41, 42a, 42b, 43, 44, 45a, and 45b may be disposed around the openings 13 and 14 of the dash panel 10. The plurality of mounting portions 41, 42a, 42b, 43, 44, 45a, and 45b may be provided to the first vertical reinforcing member 21, the second vertical reinforcing member 22, the first horizontal bracket 31, the second horizontal bracket 32, and the third horizontal bracket 33. Each of the mounting portions 41, 42a, 42b, 43, 44, 45a, and 45b may have at least one of a mounting hole or mounting hardware (e.g., a stud bolt, a nut) for mounting a fastener, and a welding surface or a welding projection for various types of welding.

The mounting portion 41 may be provided to the first vertical reinforcing member 21, and the mounting portion 41 may be located on the top end portion of the lower portion 21b of the first vertical reinforcing member 21.

The two mounting portions 42a and 42b may be provided to the second vertical reinforcing member 22, and include an upper mounting portion 42a located on the upper portion of the second vertical reinforcing member 22, and a lower mounting portion 42b located below the upper mounting portion 42a. Referring to FIGS. 2 to 5, the upper mounting portion 42a may be located on the upper portion 22a of the second vertical reinforcing member 22, and the lower mounting portion 42b may be located on the lower portion 22b of the second vertical reinforcing member 22.

The mounting portion 43 may be provided to the first horizontal bracket 31, and the mounting portion 44 may be provided to the second horizontal bracket 32. The two mounting portions 45a and 45b may be provided to the third horizontal bracket 33.

As the plurality of mounting portions 41, 42a, 42b, 43, 44, 45a, and 45b are provided to the plurality of vertical reinforcing members 21 and 22 and the plurality of horizontal brackets 31, 32, and 33, the HVAC component such as the HVAC module 90 may be mounted on the first surface 11 of the dash panel 10 through the plurality of vertical reinforcing members 21 and 22 and the plurality of horizontal brackets 31, 32, and 33. Accordingly, the mounting stiffness of the HVAC component may be improved. In particular, the HVAC component may be mounted on the first surface 11 of the dash panel 10 so that the HVAC component may be located in the front compartment 2, and thus a relatively large space may be provided in the passenger compartment.

FIG. 4 illustrates the HVAC module 90 mounted on the first surface 11 of the dash panel 10 through the plurality of mounting portions 41, 42a, 42b, 43, 44, 45a, and 45b. As illustrated in FIG. 4, the blower section 92 may have a mounting lug 95a extending toward the first vertical reinforcing member 21, and the mounting lug 95a may be mounted on the mounting portion 41 provided to the first vertical reinforcing member 21 using fasteners, welding, and/or the like. The blower section 92 may have a mounting lug 95b extending toward the first horizontal bracket 31, and the mounting lug 95b may be mounted on the mounting portion 43 provided to the first horizontal bracket 31 using fasteners, welding, and/or the like. In addition, the blower section 92 may have a mounting lug (not shown) extending toward the third horizontal bracket 33, and the mounting lug (not shown) may be mounted on the left mounting portion 45a provided to the third horizontal bracket 33 using fasteners, welding, and/or the like. As illustrated in FIG. 4, the air conditioning section 91 may have a mounting lug 95c extending toward the second horizontal bracket 32, and the mounting lug 95c may be mounted on the mounting portion 44 provided to the second horizontal bracket 32 using fasteners, welding, and/or the like. The air conditioning section 91 may have a mounting lug 95d extending toward the upper portion 22a of the second vertical reinforcing member 22, and the mounting lug 95d may be mounted on the mounting portion 42a provided to the upper portion 22a using fasteners, welding, and/or the like. The air conditioning section 91 may have a mounting lug 95e extending toward the lower portion 22b of the second vertical reinforcing member 22, and the mounting lug 95e may be mounted on the mounting portion 42b provided to the lower portion 22b using fasteners, welding, and/or the like. In addition, the air conditioning section 91 may have a mounting lug (not shown) extending toward the third horizontal bracket 33, and the mounting lug (not shown) may be mounted on the right mounting portion 45b provided to the third horizontal bracket 33 using fasteners, welding, and/or the like.

Referring to FIGS. 2 and 3, the mounting system for an HVAC component according to an embodiment of the present disclosure may include a first mounting bracket 51 and the second mounting bracket 52 which are fixed to the first surface 11 of the dash panel 10. The first mounting bracket 51 and the second mounting bracket 52 may be fixed to the top edge of the dash panel 10, and the first mounting bracket 51 and the second mounting bracket 52 may be spaced apart from each other along the length of the dash panel 10.

The first mounting bracket 51 may include a channel 51a having a cavity defined therein, and two flanges 51b provided on both side edges of the channel 51a. The two flanges 51b may be fixed to the first surface 11 of the dash panel 10 using fasteners, welding, and/or the like so that the channel 51a of the first mounting bracket 51 and the dash panel 10 may form a closed cross section. The first mounting bracket 51 may have a top flange 51c provided on a top end thereof, and the top flange 51c may be fixed to the cowl 4 using fasteners, welding, and/or the like. The first mounting bracket 51 may have a mounting surface 53 inclined toward the front of the vehicle, and at least one mounting portion 53a may be provided on the mounting surface 53. The mounting portion 53a may have at least one of a mounting hole for mounting a fastener, mounting hardware (e.g., a stud bolt, a nut), and a welding surface (or a welding projection) for various types of welding. An end portion of a strut bar 16 to be described below may be fixed to the mounting surface 53 through the mounting portion 53a. A bottom end of the first mounting bracket 51 may be adjacent to the top horizontal edge of the small opening 14, and thus peripheral stiffness of the small opening 14 of the dash panel 10 may be improved.

The second mounting bracket 52 may include a channel 52a having a cavity defined therein, and two flanges 52b provided on both side edges of the channel 52a. The two flanges 52b may be fixed to the first surface 11 of the dash panel 10 using fasteners, welding, and/or the like so that the channel 52a of the second mounting bracket 52 and the dash panel 10 may form a closed cross section. The second mounting bracket 52 may have a top flange 52c provided on a top end thereof, and the top flange 52c may be fixed to the cowl 4 using fasteners, welding, and/or the like. The top end of the upper portion 22a of the second vertical reinforcing member 22 may be fixed to the second mounting bracket 52 using fasteners, welding, and/or the like. The second mounting bracket 52 may have a mounting surface 54 inclined toward the front of the vehicle, and at least one mounting portion 54a may be provided on the mounting surface 54. The mounting portion 54a may have at least one of a mounting hole for mounting a fastener, mounting hardware (e.g., a stud bolt, a nut), and a welding surface (or a welding projection) for various types of welding. An end portion of a strut bar 16 to be described below may be fixed to the mounting surface 54 through the mounting portion 54a. A bottom end of the second mounting bracket 52 may be adjacent to the top horizontal edge of the large opening 13, and thus peripheral stiffness of the large opening 13 of the dash panel 10 may be improved.

Figure 5:
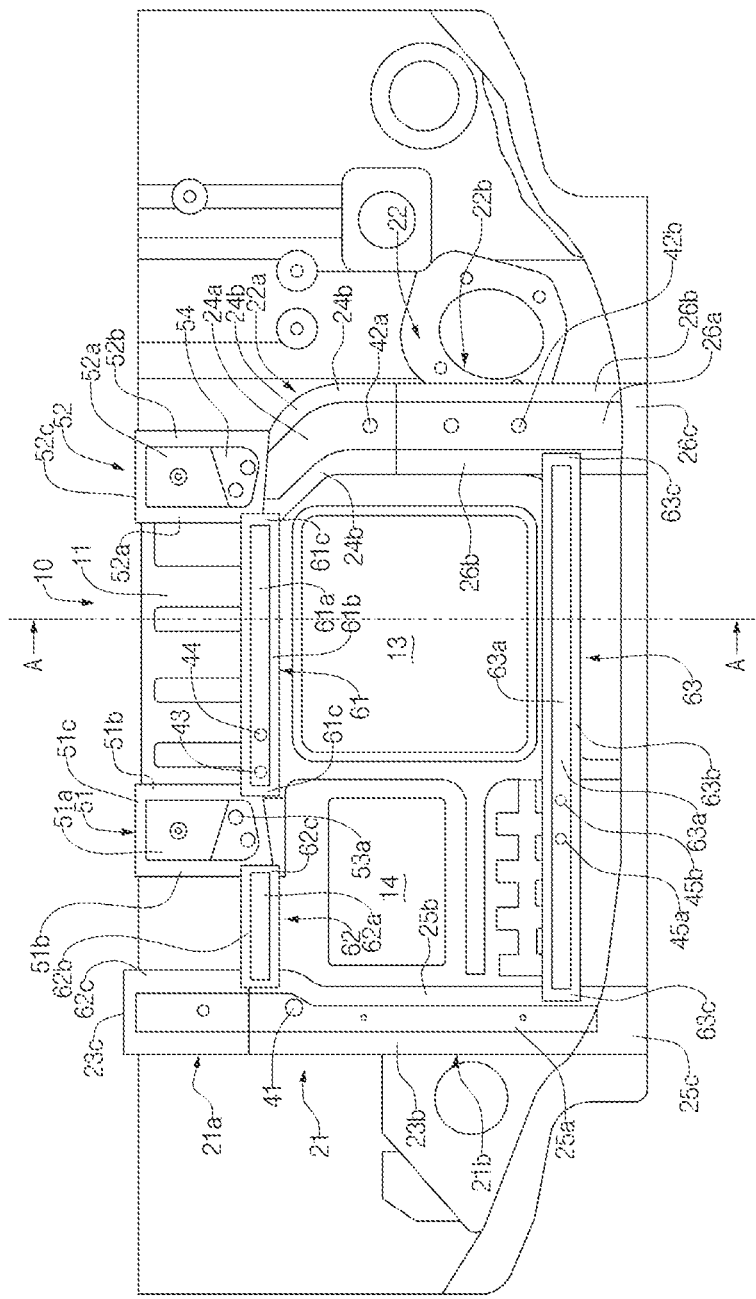
FIG. 5 illustrates a front view of a mounting system for an HVAC component according to another embodiment of the present disclosure.

Referring to FIG. 5, a mounting system for an HVAC component according to another embodiment of the present disclosure may include a first horizontal reinforcing member 61 located above the large opening 13, a second horizontal reinforcing member 62 located above the small opening 14, and a third horizontal reinforcing member 63 located below the large opening 13 and the small opening 14. The plurality of horizontal reinforcing members 61, 62, and 63 may extend along the length of the dash panel 10 around the large opening 13 and the small opening 14 of the dash panel 10, thereby achieving sufficient stiffness of the dash panel 10.

The first horizontal reinforcing member 61 may be adjacent to the top horizontal edge of the large opening 13, and the first horizontal reinforcing member 61 may extend along the length of the dash panel 10. A first end portion of the first horizontal reinforcing member 61 may be fixed to the first mounting bracket 51, and a second end portion of the first horizontal reinforcing member 61 may be fixed to the second mounting bracket 52 and the second vertical reinforcing member 22. Accordingly, the first horizontal reinforcing member 61 may connect the first mounting bracket 51 and the second mounting bracket 52 along the length of the dash panel 10. The two mounting portions 43 and 44 may be provided to the first horizontal reinforcing member 61, and the blower section 92 and the air conditioning section 91 of the HVAC module 90 may be mounted on the first horizontal reinforcing member 61 through the two mounting portions 43 and 44.

Figure 6:
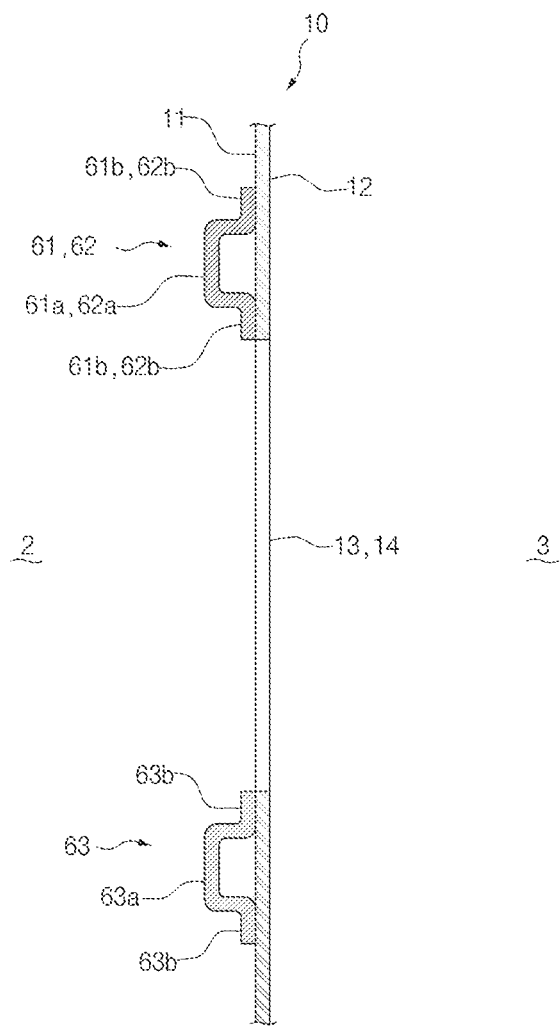
FIG. 6 illustrates a cross-sectional view, taken along line A-A of FIG. 5.

According to an embodiment, the first horizontal reinforcing member 61 may include a channel 61*a* having a cavity defined therein, and two flanges 61*b* provided on both side edges of the channel 61*a*. As illustrated in FIG. 6, the two flanges 61*b* may be fixed to the first surface 11 of the dash panel 10 using fasteners, welding, and/or the like so that the channel 61*a* of the first horizontal reinforcing member 61 and the dash panel 10 may form a closed cross section. The first horizontal reinforcing member 61 may have a pair of flanges 61*c* provided on both left and right ends thereof. One flange 61*c* may be fixed to the first mounting bracket 51, and the other flange 61*c* may be fixed to the second mounting bracket 52 and the second vertical reinforcing member 22. The first horizontal reinforcing member 61 may connect the first mounting bracket 51 and the second mounting bracket 52 along the length of the dash panel 10.

Figure 7:
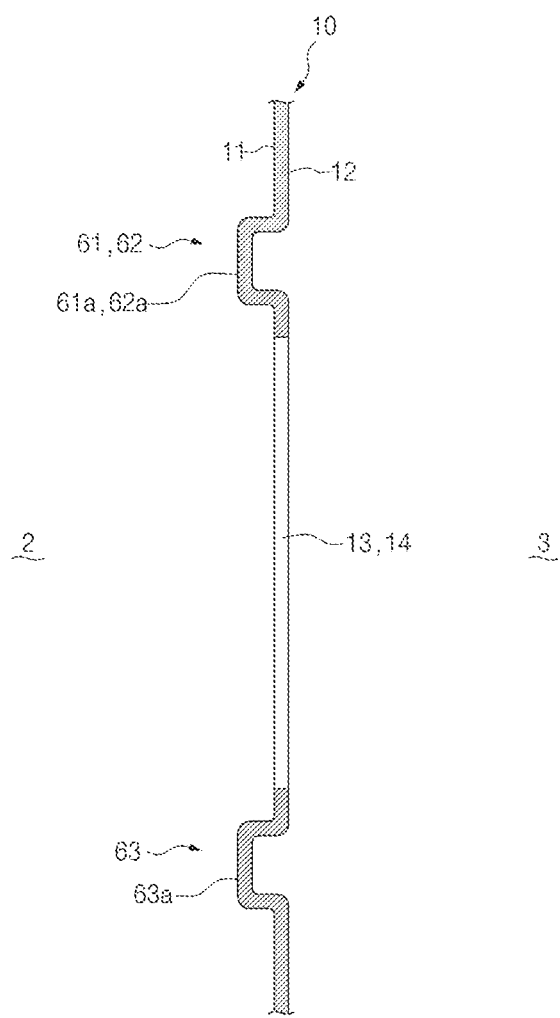
FIG. 7 illustrates a modification to the embodiment illustrated in FIG. 6.

According to another embodiment, the first horizontal reinforcing member 61 and the dash panel 10 may be integrally formed by pressing, casting, and/or the like so that the first horizontal reinforcing member 61 and the dash panel 10 may form a unitary one-piece structure. Referring to FIG. 7, the first horizontal reinforcing member 61 may have the channel 61*a* raised from the first surface 11 of the dash panel 10 toward the front compartment 2.

The second horizontal reinforcing member 62 may be adjacent to the top horizontal edge of the small opening 14, and the second horizontal reinforcing member 62 may extend along the length of the dash panel 10. A first end portion of the second horizontal reinforcing member 62 may be fixed to the first vertical reinforcing member 21, and a second end portion of the second horizontal reinforcing member 62 may be fixed to the first mounting bracket 51. Accordingly, the second horizontal reinforcing member 62 may connect the first vertical reinforcing member 21 and the first mounting bracket 51 along the length of the dash panel 10.

According to an embodiment, the second horizontal reinforcing member 62 may include a channel 62*a* having a cavity defined therein, and two flanges 62*b* provided on both side edges of the channel 62*a*. As illustrated in FIG. 6, the two flanges 62*b* may be fixed to the first surface 11 of the dash panel 10 using fasteners, welding, and/or the like so that the channel 62*a* of the second horizontal reinforcing member 62 and the dash panel 10 may form a closed cross section. The second horizontal reinforcing member 62 may have a pair of flanges 62*c* provided on both left and right ends thereof. One flange 62*c* may be fixed to the first vertical reinforcing member 21, and the other flange 62*c* may be fixed to the first mounting bracket 51. Accordingly, the second horizontal reinforcing member 62 may connect the first vertical reinforcing member 21 and the first mounting bracket 51 along the length of the dash panel 10.

According to another embodiment, the second horizontal reinforcing member 62 and the dash panel 10 may be integrally formed by pressing, casting, and/or the like so that the second horizontal reinforcing member 62 and the dash panel 10 may form a unitary one-piece structure. Referring to FIG. 7, the second horizontal reinforcing member 62 may have the channel 62*a* raised from the first surface 11 of the dash panel 10 toward the front compartment 2.

The third horizontal reinforcing member 63 may be adjacent to the bottom horizontal edge of the large opening 13 and the bottom horizontal edge of the small opening 14, and the third horizontal reinforcing member 63 may extend along the length of the dash panel 10. A first end portion of the third horizontal reinforcing member 63 may be fixed to the first vertical reinforcing member 21, and a second end portion of the third horizontal reinforcing member 63 may be fixed to the second vertical reinforcing member 22. Accordingly, the third horizontal reinforcing member 63 may connect the first vertical reinforcing member 21 and the second vertical reinforcing member 22 along the length of the dash panel 10. The two mounting portions 45*a* and 45*b* may be provided to the third horizontal reinforcing member 63, and the blower section 92 and the air conditioning section 91 of the HVAC module 90 may be mounted on the third horizontal reinforcing member 63 through the two mounting portions 45*a* and 45*b*.

As described above, the plurality of mounting portions 43, 44, 45*a*, and 45*b* may be provided to the first horizontal reinforcing member 61 and the third horizontal reinforcing member 63 so that the HVAC component such as the HVAC module 90 may be firmly mounted on the first surface 11 of the dash panel 10 through the first horizontal reinforcing member 61 and the third horizontal reinforcing member 63.

According to an embodiment, the third horizontal reinforcing member 63 may include a channel 63*a* having a cavity defined therein, and two flanges 63*b* provided on both side edges of the channel 63*a*. As illustrated in FIG. 6, the two flanges 63*b* may be fixed to the first surface 11 of the dash panel 10 using fasteners, welding, and/or the like so that the channel 63*a* of the third horizontal reinforcing member 63 and the dash panel 10 may form a closed cross section. The third horizontal reinforcing member 63 may have a pair of flanges 63*c* provided on both left and right ends thereof. One flange 63*c* may be fixed to the first vertical reinforcing member 21, and the other flange 63*c* may be fixed to the second vertical reinforcing member 22. Accordingly, the third horizontal reinforcing member 63 may connect the first vertical reinforcing member 21 and the second vertical reinforcing member 22 along the length of the dash panel 10.

According to another embodiment, the third horizontal reinforcing member 63 and the dash panel 10 may be integrally formed by pressing, casting, and/or the like so that the third horizontal reinforcing member 63 and the dash panel 10 may form a unitary one-piece structure. Referring to FIG. 7, the third horizontal reinforcing member 63 may have the channel 63*a* raised from the first surface 11 of the dash panel 10 toward the front compartment 2.

Figure 8:
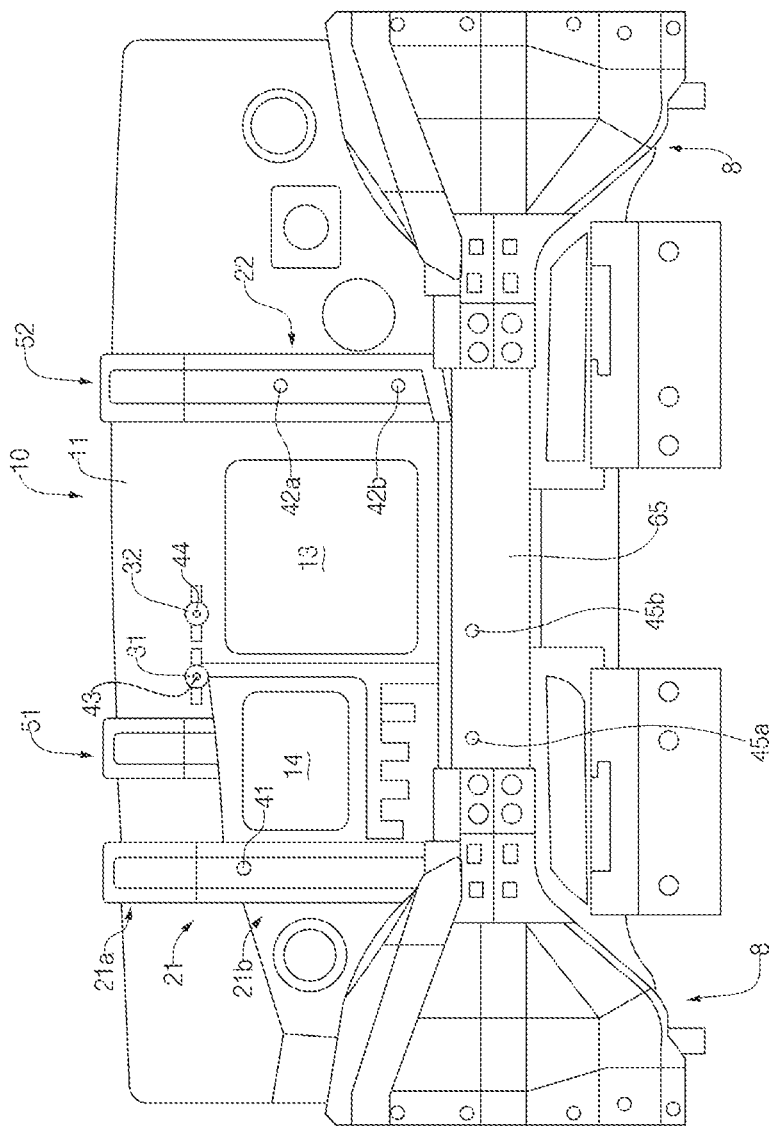
FIG. 8 illustrates a front view of a mounting system for an HVAC component according to another embodiment of the present disclosure.

Referring to FIG. 8, a mounting system for an HVAC component according to another embodiment of the present disclosure may include a dash cross member 65 fixed to the first surface 11 of the dash panel 10, and the dash cross member 65 may extend along the width of the vehicle. A pair of rear lower members 8 may be mounted on both side edges of the dash panel 10, and the dash cross member 65 may connect the pair of rear lower members 8 along the length of the dash panel 10. The two mounting portions 45a and 45b may be provided to the dash cross member 65, and the blower section 92 and the air conditioning section 91 of the HVAC module 90 may be mounted on the dash cross member 65 through the two mounting portions 45a and 45b. A front end of each rear lower member 8 may be fixed to a rear end of a front side member 18 (see FIG. 11), and a rear end of each rear lower member 8 may be fixed to a front end of a side sill (not shown). The dash cross member 65 may be disposed adjacent to the large opening 13 and the small opening 14 of the dash panel 10, thereby achieving sufficient stiffness of the dash panel 10.

Figure 9:
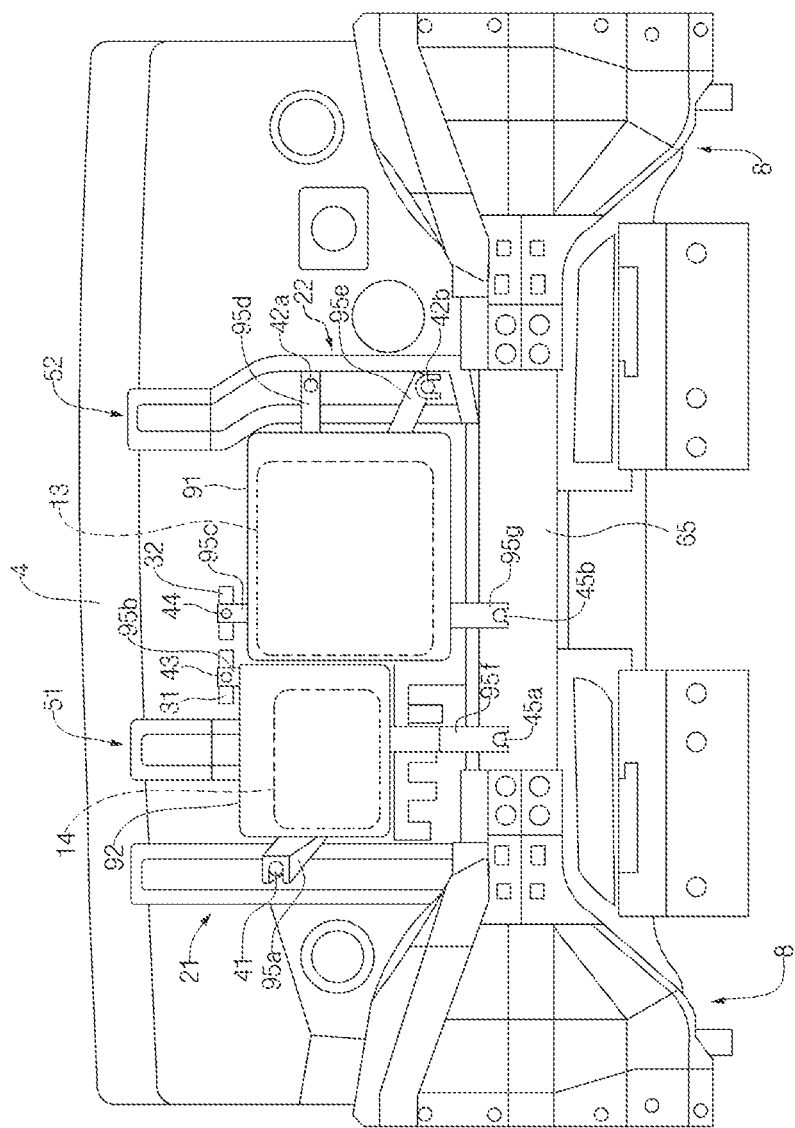
FIG. 9 illustrates a front view of a mounting system for an HVAC component according to another embodiment of the present disclosure.

FIG. 9 illustrates a mounting system for an HVAC component according to another embodiment of the present disclosure. Referring to FIG. 9, the first vertical reinforcing member 21 may extend from the dash cross member 65 to the cowl 4, and the second vertical reinforcing member 22 may extend from the dash cross member 65 to the second mounting bracket 52. The upper portion of the second vertical reinforcing member 22 may be bent toward the large opening 13. The blower section 92 may have the mounting lug 95a extending toward the first vertical reinforcing member 21, and the mounting lug 95a may be mounted on the mounting portion 41 provided to the first vertical reinforcing member 21 using fasteners, welding, and/or the like. The blower section 92 may have the mounting lug 95b extending toward the first horizontal bracket 31, and the mounting lug 95b may be mounted on the mounting portion 43 provided to the first horizontal bracket 31 using fasteners, welding, and/or the like. In addition, the blower section 92 may have a mounting lug 95f extending toward the dash cross member 65, and the mounting lug 95f may be mounted on the left mounting portion 45a provided to the dash cross member 65 using fasteners, welding, and/or the like. The air conditioning section 91 may have the mounting lug 95c extending toward the second horizontal bracket 32, and the mounting lug 95c may be mounted on the mounting portion 44 provided to the second horizontal bracket 32 using fasteners, welding, and/or the like. The air conditioning section 91 may have two mounting lugs 95d and 95e extending toward the second vertical reinforcing member 22. The upper mounting lug 95d may be mounted on the upper mounting portion 42a provided to the second vertical reinforcing member 22 using fasteners, welding, and/or the like, and the lower mounting lug 95e may be mounted on the lower mounting portion 42b provided to the second vertical reinforcing member 22 using fasteners, welding, and/or the like. The air conditioning section 91 may have a mounting lug 95g extending toward the dash cross member 65, and the mounting lug 95g may be mounted on the right mounting portion 45b provided to the dash cross member 65 using fasteners, welding, and/or the like. Referring to FIG. 9, the air conditioning section 91 and the blower section 92 of the HVAC module 90 may be mounted on the peripheries of the openings 13 and 14 through the mounting portions 41, 42a, 42b, 43, 44, 45a, and 45b so that the HVAC module 90 may be firmly supported to the first surface 11 of the dash panel 10.

Figure 10:
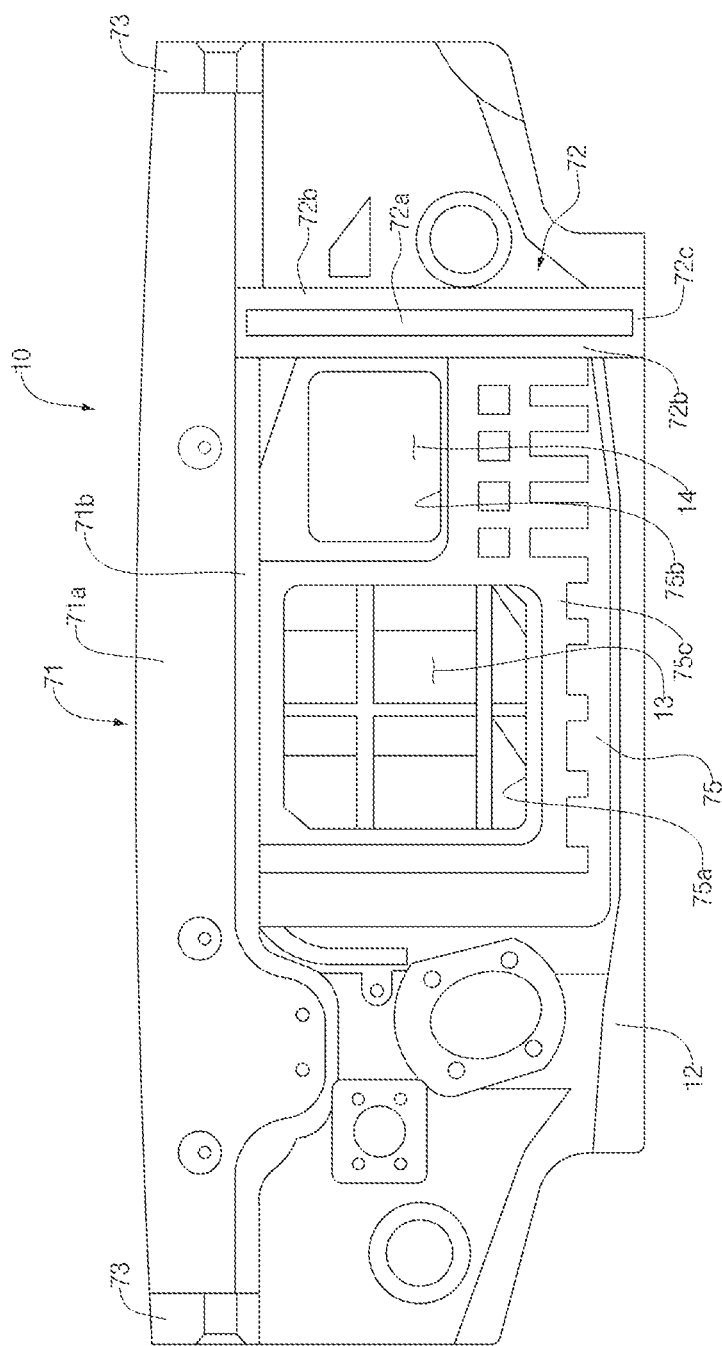
FIG. 10 illustrates a rear view of a mounting system for an HVAC component according to an embodiment of the present disclosure.

Referring to FIG. 10, the mounting system for an HVAC component according to an embodiment of the present disclosure may further include a stiffened cross member 71 fixed to the second surface 12 of the dash panel 10. The stiffened cross member 71 may extend along the length of the dash panel 10, and the stiffened cross member 71 may be adjacent to the top horizontal edges of the large opening 13 and the small opening 14. The stiffened cross member 71 may be fixed to the top edge of the second surface 12 of the dash panel 10. The stiffened cross member 71 may include a channel 71a having a cavity defined therein, and a flange 71b provided on a bottom edge of the channel 71a. The flange 71b of the stiffened cross member 71 may be fixed to the second surface 12 of the dash panel 10 using fasteners, welding, and/or the like so that the channel 71a of the stiffened cross member 71 and the dash panel 10 may form a closed cross section. The stiffened cross member 71 may include a pair of end brackets 73 fixed to both ends thereof. The stiffened cross member 71 may be disposed adjacent to the top horizontal edges of the large opening 13 and the small opening 14 on the second surface 12 of the dash panel 10, thereby improving stiffness of the upper portion of the dash panel 10.

Referring to FIG. 10, the mounting system for an HVAC component according to an embodiment of the present disclosure may further include a vertical stiffened member 72 fixed to the second surface 12 of the dash panel 10. The vertical stiffened member 72 may extend along the height of the dash panel 10. The vertical stiffened member 72 may extend from the stiffened cross member 71 to the bottom edge of the dash panel 10. The vertical stiffened member 72 may be connected perpendicular to the stiffened cross member 71 so that stiffness of the dash panel 10 may be further improved. The vertical stiffened member 72 may be adjacent to the vertical edge of the small opening 14. The vertical stiffened member 72 may include a channel 72a having a cavity defined therein, and two flanges 72b provided on both side edges of the channel 72a. The two flanges 72b may be fixed to the second surface 12 of the dash panel 10 using fasteners, welding, and/or the like so that the channel 72a of the vertical stiffened member 72 and the dash panel 10 may form a closed cross section. The vertical stiffened member 72 may have a bottom flange 72c provided on a bottom end thereof, and the bottom flange 72c may be fixed to the bottom edge of the dash panel 10 using fasteners, welding, and/or the like.

Referring to FIG. 10, the mounting system for an HVAC component according to an embodiment of the present disclosure may further include a reinforcement plate 75 fixed to the second surface 12 of the dash panel 10. The reinforcement plate 75 may have a first opening 75a aligned with the large opening 13 of the dash panel 10, and a second opening 75b aligned with the small opening 14 of the dash panel 10. The reinforcement plate 75 may overlap and be fixed to a peripheral portion of the large opening 13 and a peripheral portion of the small opening 14 of the dash panel 10. The reinforcement plate 75 may have a reinforcement portion 75c formed by metal working such as embossing, drawing, or coining. In particular, the reinforcement portion 75c may be raised from the reinforcement plate 75 toward the front compartment 2 or the passenger compartment 3, and the reinforcement portion 75c may be provided to the peripheral portion of the large opening 13 and the peripheral portion of the small opening 14 of the dash panel 10. The reinforcement plate 75 may be fixed to the peripheral portion of the large opening 13 and the peripheral portion of the small opening 14 of the dash panel 10 so that stiffness of the dash panel 10 may be further improved.

Figure 11:
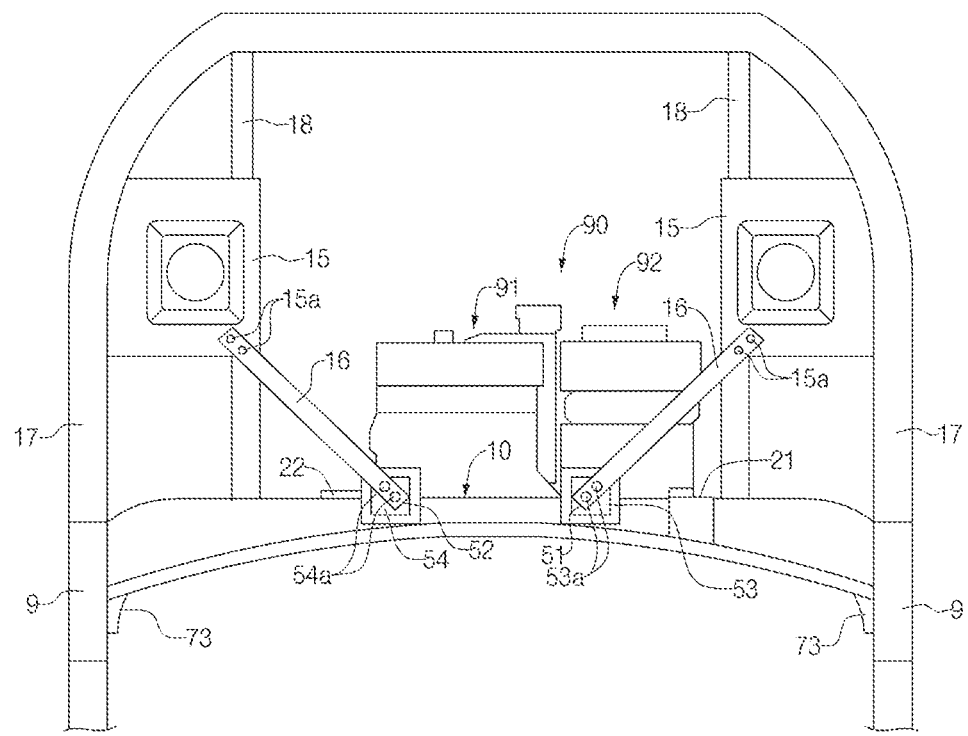
FIG. 11 illustrates a plan view of a front structure of a vehicle to which a mounting system for an HVAC component according to an embodiment of the present disclosure is applied.

Referring to FIG. 11, a pair of front pillars 9 may be disposed on both sides of the dash panel 10, and each end bracket 73 may be fixed to the corresponding front pillar 9 using fasteners, welding, and/or the like. The stiffened cross member 71 may be firmly connected to the pair of front pillars 9 through the pair of end brackets 73. Thus, stiffness of the dash panel 10 may be further improved, and a load applied to the dash panel 10 may be uniformly distributed and transferred to the pair of front pillars 9.

Referring to FIG. 11, a pair of fender apron members 17 may extend from the pair of front pillars 9 toward the front of the vehicle. The pair of front side members 18 may extend from the dash panel 10 toward the front of the vehicle, and the pair of front side members 18 may be spaced apart from each other along the width of the vehicle. A pair of damper housings 15 may be disposed in front of the dash panel 10, and each damper housing 15 may be mounted on the corresponding fender apron member 17 and the corresponding front side member 18. Each damper housing 15 may connect the corresponding fender apron member 17 and the corresponding front side member 18. The pair of strut bars 16 may extend diagonally from the dash panel 10, and may connect the mounting brackets 51 and 52 mounted on the dash panel 10 and the corresponding damper housings 15, respectively. At least one mounting portion 15a may be provided to each damper housing 15, and the mounting portion 15a may have at least one of a mounting hole or mounting hardware (e.g., a stud bolt, a nut) for mounting a fastener, and a welding surface or a welding projection for various types of welding. For example, as illustrated in FIG. 11, the right strut bar 16 may extend diagonally so as to connect the first mounting bracket 51 and the right damper housing 15. The mounting surface 53 of the first mounting bracket 51 may be inclined toward the right damper housing 15. A rear end of the right strut bar 16 may be mounted on the mounting portion 53a of the mounting surface 53 of the first mounting bracket 51 using fasteners, welding, and/or the like, and a front end of the right strut bar 16 may be mounted on the mounting portion 15a of the right damper housing 15 using fasteners, welding, and/or the like. The left strut bar 16 may extend diagonally so as to connect the second mounting bracket 52 and the left damper housing 15. The mounting surface 54 of the second mounting bracket 52 may be inclined toward the left damper housing 15. A rear end of the left strut bar 16 may be mounted on the mounting portion 54a of the mounting surface 54 of the second mounting bracket 52 using fasteners, welding, and/or the like, and a front end of the left strut bar 16 may be mounted on the mounting portion 15a of the left damper housing 15 using fasteners, welding, and/or the like.

Figure 12:
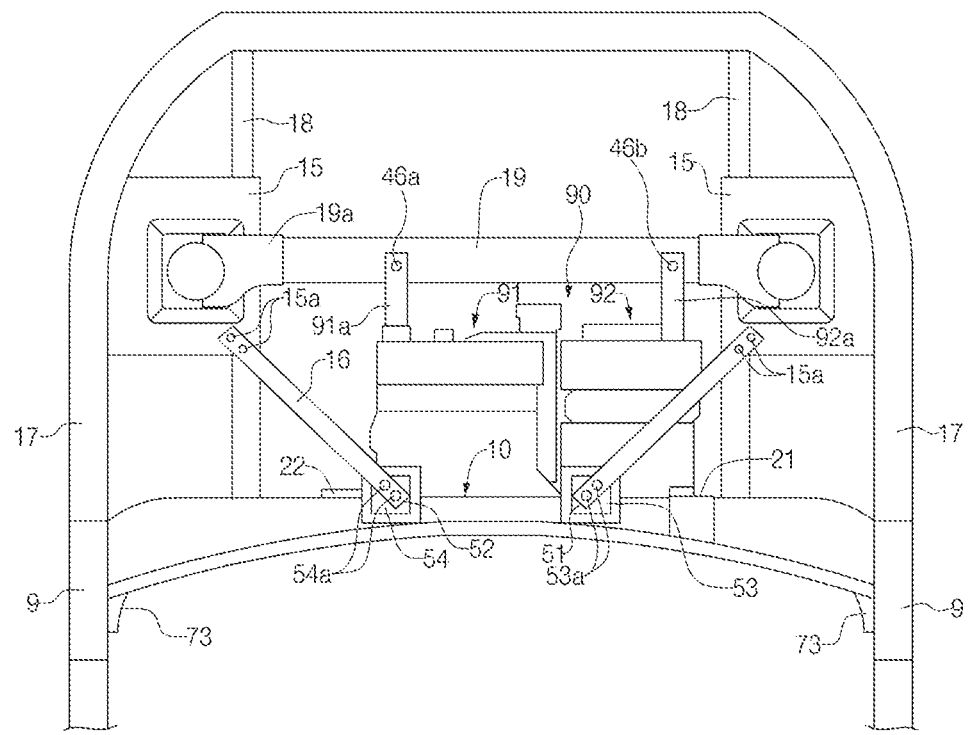
FIG. 12 illustrates a plan view of a front structure of a vehicle to which a mounting system for an HVAC component according to another embodiment of the present disclosure is applied.

Referring to FIG. 12, a mounting system for an HVAC component according to another embodiment of the present disclosure may further include a cross bar 19 connecting the pair of damper housings 15. Front portions of the HVAC components 91 and 92 such as the air conditioning section 91 and the blower section 92 may be mounted on the cross bar 19. Two mounting portions 46a and 46b may be provided to the cross bar 19, and each of the mounting portions 46a and 46b may have at least one of a mounting hole or mounting hardware (e.g., a stud bolt, a nut) for mounting a fastener, and a welding surface or a welding projection for various types of welding. The air conditioning section 91 may have a mounting lug 91a extending from the front portion thereof toward the cross bar 19, and the mounting lug 91a may be mounted on the left mounting portion 46a provided to the cross bar 19 using fasteners, welding, and/or the like. The blower section 92 may have a mounting lug 92a extending from the front portion thereof toward the cross bar 19, and the mounting lug 92a may be mounted on the right mounting portion 46b provided to the cross bar 19 using fasteners, welding, and/or the like. The HVAC components 91 and 92 may be mounted on the first surface 11 of the dash panel 10 and the cross bar 19 through the plurality of mounting portions 41, 42a, 42b, 43, 44, 45a, 45b, 46a, and 46b so that the HVAC components 91 and 92 may be firmly supported between the first surface 11 of the dash panel 10 and the cross bar 19, and the mounting stiffness of the HVAC components 91 and 92 located in the front compartment of the vehicle may be sufficiently achieved.

Figure 13:
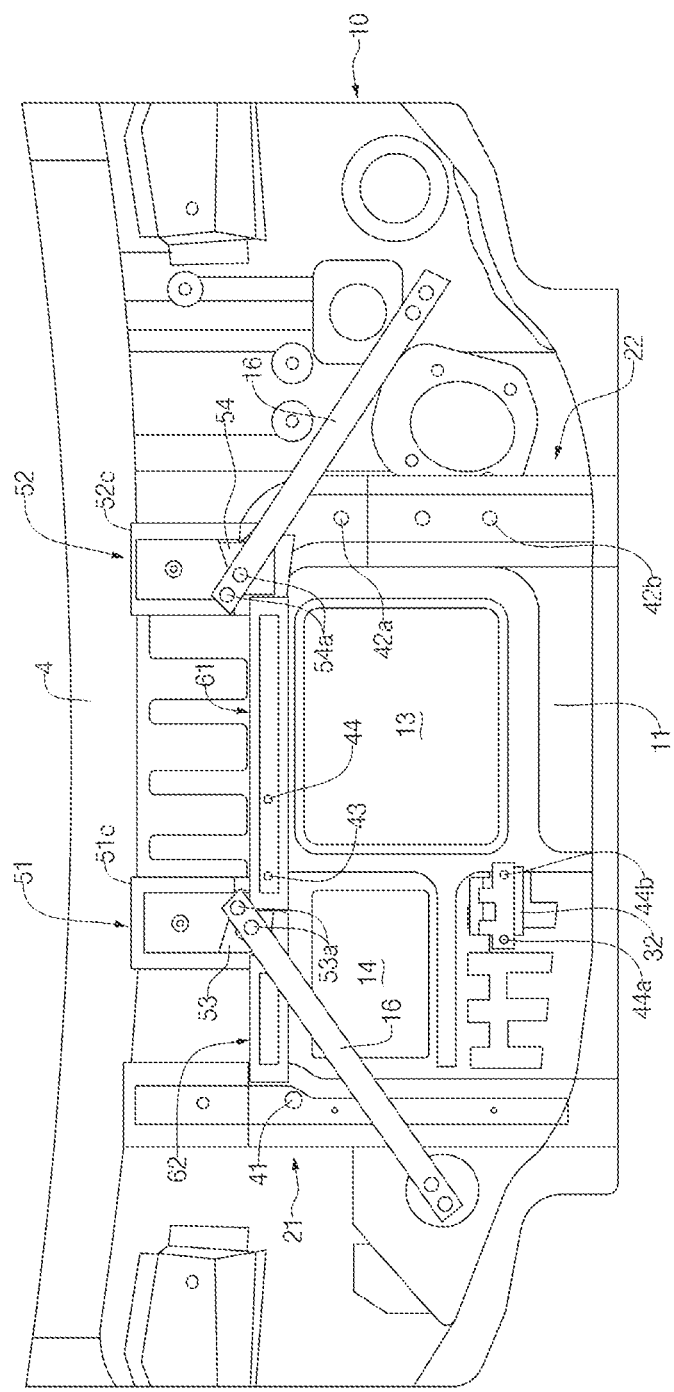
FIG. 13 illustrates a front view of a state in which a pair of strut bars are mounted on a mounting system for an HVAC component according to another embodiment of the present disclosure.

Referring to FIG. 13, the top flange 51c of the first mounting bracket 51 and the top flange 52c of the second mounting bracket 52 may be fixed to the cowl 4 using fasteners, welding, and/or the like. The first horizontal reinforcing member 61 may connect the first mounting bracket 51 and the second mounting bracket 52 so that the first horizontal reinforcing member 61 may be connected to the cowl 4 and the strut bars 16 through the first mounting bracket 51 and the second mounting bracket 52. In addition, the end portions of the first horizontal reinforcing member 61 may be integrally connected to the mounting surfaces 53 and 54 of the corresponding mounting brackets 51 and 52 so that a load applied to the dash panel 10 may be uniformly distributed and transferred to the cowl 4 and the strut bars 16. Thus, stiffness and crashworthiness of the dash panel 10 may be improved.

Figure 14:
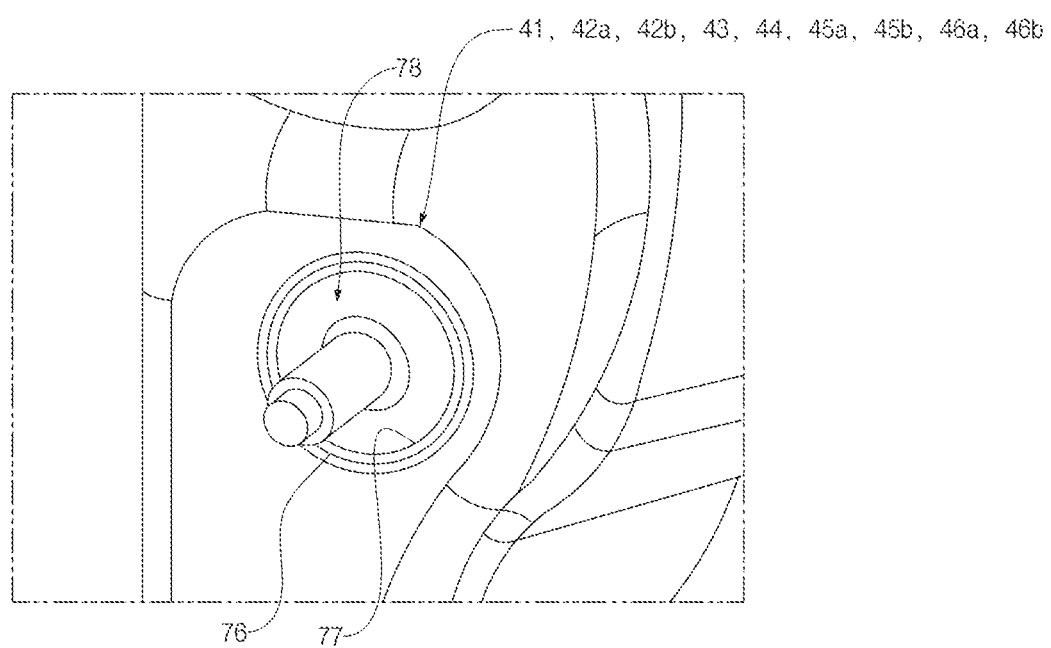
FIG. 14 illustrates a perspective view of a mounting portion of a mounting system for an HVAC component according to an embodiment of the present disclosure.

Referring to FIG. 14, each of the mounting portions 41, 42a, 42b, 43, 44, 45a, 45b, 46a, and 46b may have a through hole 77 formed in the corresponding member (the vertical reinforcing member, the horizontal bracket, or the horizontal reinforcing member), and mounting hardware 78 may be mounted in the through hole 77. The mounting hardware 78 may be various fasteners such as a mounting bolt and a mounting nut. For example, as illustrated in FIG. 14, the mounting hardware 78 may be a blind head riveted into the through hole 77. The mounting lugs 95a, 95b, 95c, 95d, 95e, 91a, and 92a of the HVAC components 91 and 92 may be mounted to the mounting hardware 78. In particular, each mounting portion may have a stiffened portion 76 provided around the mounting hardware 78, and the stiffened portion 76 may be a stiffened bead raised toward the front compartment 2 or the passenger compartment 3 by metal working such as embossing, drawing, coining, or stamping. The stiffened portion 76 may increase stiffness of the mounting portion itself and support stiffness of the mounting hardware 78. Even when the dash panel 10, the vertical reinforcing members 21 and 22, the horizontal brackets 31, 32, and 33, the horizontal reinforcing members 61, 62, and 63, and the cross bar 19 are made of a material (e.g. aluminum) with lower stiffness than steel, the stiffened portion 76 may increase the stiffness of the mounting portion and the support stiffness of the mounting hardware 78, thereby additionally achieving the mounting stiffness of the HVAC components.

As set forth above, the mounting system for an HVAC component according to embodiments of the present disclosure may be designed to allow at least some HVAC components of the HVAC module to be firmly mounted on the front surface of the dash panel (i.e., the surface of the dash panel facing the front compartment) by increasing the stiffness of the dash panel using the vertical reinforcing members, the horizontal brackets, and/or the horizontal reinforcing members, thereby locating at least some HVAC components in the front compartment, which makes it possible to provide a relatively large space in the passenger compartment, to slim down a cockpit located on the front of the passenger compartment, and to easily build a flat floor structure of the vehicle body.

Hereinabove, although the present disclosure has been described with reference to embodiments and the accompanying drawings, the present disclosure is not limited thereto, but may be variously modified and altered by those skilled in the art to which the present disclosure pertains without departing from the spirit and scope of the present disclosure claimed in the following claims.

The invention claimed is:

1. A mounting system for a heating, ventilation, and air conditioning (HVAC) component, the mounting system comprising:
   a dash panel configured to divide a front compartment from a passenger compartment, the dash panel having an opening;
   an HVAC component positioned in the front compartment;
   a plurality of mounting portions positioned around the opening, the plurality of mounting portions being configured to mount the HVAC component;
   a vertical reinforcing member positioned adjacent to the opening, and extending along the height of the dash panel; and
   a plurality of horizontal brackets positioned adjacent to the opening, and extending along the length of the dash panel;
   wherein the vertical reinforcing member and the horizontal brackets are mounted on the first surface of the dash panel, and wherein the vertical reinforcing member and the horizontal brackets each include the plurality of mounting portions; and
   wherein the dash panel includes a first surface facing the front compartment, and a second surface facing the passenger compartment.

2. The mounting system according to claim 1, further comprising a horizontal reinforcing member positioned adjacent to the opening, extending along the length of the dash panel, and connected to the vertical reinforcing member.

3. The mounting system according to claim 2, wherein the vertical reinforcing member and the horizontal reinforcing member are mounted on the first surface of the dash panel, and wherein the vertical reinforcing member and the horizontal brackets each include the plurality of mounting portions.

4. The mounting system according to claim 1, wherein the dash panel has a first side edge and a second side edge, and wherein a first rear lower member is mounted on the first side edge of the dash panel and a second rear lower member is mounted on the second side edge of the dash panel; and
   a dash cross member positioned adjacent to the opening, extending along the length of the dash panel, and connecting the pair of rear lower members;
   wherein the dash cross member includes at least one of the plurality of mounting portions.

5. The mounting system according to claim 1, further comprising a stiffened cross member mounted on the second surface of the dash panel, and extending along the length of the dash panel.

6. The mounting system according to claim 5, wherein the dash panel has a first side and a second side, and wherein a first front pillar is connected to the first side of the dash panel and a second front pillar is connected to the second side of the dash panel; and
   a first end bracket fixed to a first end of the stiffened cross member and connected to the first front pillar, and a second end bracket fixed to a second end of the stiffened cross member and connected to the second front pillar.

7. The mounting system according to claim 6, wherein the stiffened cross member is fixed to a top edge of the dash panel, and the stiffened cross member is positioned adjacent to the opening.

8. The mounting system according to claim 7, further comprising a vertical stiffened member fixed to the second surface of the dash panel, and extending along the height of the dash panel.

9. The mounting system according to claim 8, wherein the vertical stiffened member is positioned adjacent to the opening, and is connected to the stiffened cross member.

10. The mounting system according to claim 1, further comprising a reinforcement plate mounted on the second surface of the dash panel, and having an opening aligned with the opening of the dash panel,
    wherein the reinforcement plate overlaps a peripheral portion of the opening of the dash panel on the second surface of the dash panel.

11. The mounting system according to claim 1, further comprising a pair of mounting brackets mounted on the first surface of the dash panel; and
    a horizontal reinforcing member located adjacent to the opening, extending along the length of the dash panel, and connecting the pair of mounting brackets.

12. The mounting system according to claim 11, further comprising a pair of damper housings disposed in front of the dash panel; and
    a pair of strut bars connecting the pair of damper housings and the pair of mounting brackets.

13. The mounting system according to claim 12, further comprising a cross bar connecting the pair of damper housings,
    wherein the cross bar has at least one mounting portion, and
    a front portion of the HVAC component is mounted on the mounting portion of the cross bar.

14. The mounting system according to claim 11, wherein one mounting bracket of the pair of mounting brackets is connected to the vertical reinforcing member, and the mounting bracket and the vertical reinforcing member are continuously connected along the height of the dash panel.

15. The mounting system according to claim 11, wherein the pair of mounting brackets are fixed to a cowl, and the cowl is positioned on the dash panel.

16. The mounting system according to claim 1, wherein each mounting portion includes:
    mounting hardware to which a mounting lug of the HVAC component is mounted; and
    a stiffened portion positioned around the mounting hardware and supporting the mounting hardware.

* * * * *